US012705837B2

(12) United States Patent
Ikegami et al.

(10) Patent No.: US 12,705,837 B2
(45) Date of Patent: Aug. 11, 2026

(54) INFORMATION PROCESSING APPARATUS, INFORMATION PROCESSING PROGRAM, AND SYSTEM AND METHOD FOR MANUFACTURING DECORATIVE SHEET

(71) Applicant: LINTEC CORPORATION, Tokyo (JP)

(72) Inventors: Daisuke Ikegami, Tokyo (JP); Akihito Yamada, Tokyo (JP)

(73) Assignee: LINTEC Corporation, Tokyo (JP)

( * ) Notice: Subject to any disclaimer, the term of this patent is extended or adjusted under 35 U.S.C. 154(b) by 112 days.

(21) Appl. No.: 18/713,822

(22) PCT Filed: Sep. 20, 2022

(86) PCT No.: PCT/JP2022/034939
§ 371 (c)(1),
(2) Date: May 28, 2024

(87) PCT Pub. No.: WO2023/112414
PCT Pub. Date: Jun. 22, 2023

(65) Prior Publication Data

US 2025/0148714 A1 May 8, 2025

(30) Foreign Application Priority Data

Dec. 13, 2021 (JP) ................................ 2021-201596

(51) Int. Cl.
*G06T 17/20* (2006.01)
*B41J 11/66* (2006.01)

(52) U.S. Cl.
CPC ............. *G06T 17/20* (2013.01); *B41J 11/663* (2013.01)

(58) Field of Classification Search
CPC . G06T 17/20; G06T 7/00; B41J 11/663; B41J 5/30; G06F 3/12
See application file for complete search history.

(56) References Cited

U.S. PATENT DOCUMENTS 5,958,536 A * 9/1999 Gelsinger ............ G09F 3/0288 40/310
8,261,195 B2 9/2012 Buehler
(Continued)

FOREIGN PATENT DOCUMENTS

JP 11-34425 A 2/1999
JP 2004075845 A 3/2004
(Continued)

OTHER PUBLICATIONS

International Search Report issued on Dec. 6, 2022, in corresponding International Application No. PCT/JP2022/034939, 14 pages.
(Continued)

*Primary Examiner* — William A Beutel
(74) *Attorney, Agent, or Firm* — Maier & Maier, PLLC

(57) ABSTRACT

An information processing apparatus, an information processing program, and a system and a method for manufacturing a decorative sheet which can be applied for any article and easily customize a seal, a cover, or the like that covers the article. An information processing apparatus is applied to a system that manufactures a decorative sheet, which is attached to an article to decorate the article, and includes an acquisition unit, a model generation unit, and an image generation unit. The acquisition unit acquires an image of the article. The model generation unit generates a three-dimensional model of the article based on the image of the article. The image generation unit arranges a design on at least a part of a surface of the three-dimensional model, and generates image data for printing the arranged design on a pressure-sensitive adhesive sheet.

21 Claims, 9 Drawing Sheets

(56) References Cited

U.S. PATENT DOCUMENTS

| | | | | |
|---|---|---|---|---|
| 2005/0186010 | A1 | 8/2005 | Shibata et al. | |
| 2007/0262141 | A1* | 11/2007 | Ito | G06F 3/126<br>235/383 |
| 2011/0048256 | A1 | 3/2011 | Atta et al. | |
| 2020/0349758 | A1* | 11/2020 | Paulson | G06T 15/04 |

FOREIGN PATENT DOCUMENTS

| | | | |
|---|---|---|---|
| JP | 2004506777 | A | 3/2004 |
| JP | 2005171030 | A | 6/2005 |
| JP | 2006-68821 | A | 3/2006 |
| JP | 2007512163 | A | 5/2007 |
| JP | 2007-183719 | A | 7/2007 |
| JP | 2010-532020 | A | 7/2007 |
| JP | 2008-541246 | A | 11/2008 |
| JP | 2009506165 | A | 2/2009 |
| JP | 2010083915 | A | 4/2010 |
| JP | 2010104980 | A | 5/2010 |
| JP | 2010-123007 | A | 6/2010 |
| JP | 2013514914 | A | 5/2013 |
| WO | 2019193501 | A1 | 10/2019 |

OTHER PUBLICATIONS

Office Action issued on Apr. 1, 2025, in corresponding Japanese Application No. 2021-553726, 6 pages.

Office Action issued on Mar. 25, 2025, in corresponding Japanese Application No. 2021-201596, 8 pages.

* cited by examiner

POSITION C
(TOP SURFACE)
10
POSITION B
(SIDE SURFACE)
10
300
10
POSITION A
(FRONT SURFACE)
CYLINDRICAL ARTICLE

400
RECEPTION AND ARRANGEMENT OF DESIGN
411
OPERATION MENU
412
SELECTION OF PATTERN
413
SELECTION OF IMAGE
414
COMPLETION OF DESIGN RECEPTION
415
GENERATION OF IMAGE DATA
407
408
403
410
409

FINISHED PRODUCT OBTAINED BY ATTACHING DECORATIVE SHEET TO ARTICLE

ARTICLE OF RAILROAD MODEL (TOY)

THREE-DIMENSIONAL MODEL

DEVELOPED VIEW

INFORMATION PROCESSING APPARATUS, INFORMATION PROCESSING PROGRAM, AND SYSTEM AND METHOD FOR MANUFACTURING DECORATIVE SHEET

TECHNICAL FIELD

The present invention relates to an information processing apparatus, an information processing program, and a system and a method for manufacturing a decorative sheet.

BACKGROUND

It is convenient if a seal, a cover, or the like having a favorite design can be customized and attached to a familiar article that is usually used. However, in a case where a shape of an article is complicated, it is not easy to select and process a design of a seal, a cover, or the like in accordance with the shape of the article.

In relation to this, for example, there is known a method in which a user can customize a product cover by selecting a design of the product cover from designs prepared in advance or editing the selected design when purchasing a product such as a mobile phone or a game machine by mail order or the like (for example, JP 2010/532020 A and JP 2008/541246 A). For example, the user who purchases the product inputs necessary items such as information regarding the product, such as a manufacturer and a model name, and information regarding the design of the product cover on an input screen displayed on a personal computer connected to the Internet or a terminal device at a shop front, and orders the product.

SUMMARY

However, in method in Patent Literature 1: JP 2010/532020 A and Patent Literature 2: JP 2008/541246 A, a target for which the product cover can be customized is limited to a product registered in advance, and thus, there is a problem that it takes time and effort to input the information regarding the product such as the manufacturer and the model name.

The present invention has been made in view of the above circumstances, and provides an information processing apparatus, an information processing program, and a system and a method for manufacturing a decorative sheet which can be applied for any article and easily customize a seal, a cover, or the like that covers the article.

An information processing apparatus according to the present invention that achieves the above object is applied to a system that manufactures a decorative sheet, which is attached to an article to decorate the article, and includes: an acquisition unit that acquires an image of the article; a model generation unit that generates a three-dimensional model of the article based on the image of the article; and an image generation unit that arranges a design on at least a part of a surface of the three-dimensional model and generates image data for printing the arranged design on a pressure-sensitive adhesive sheet.

A system that manufactures a decorative sheet according to the present invention that achieves the above object includes the information processing apparatus and a printing device that prints an image based on the image data on the decorative sheet.

A method for manufacturing a decorative sheet according to the present invention that achieves the above object is a method for manufacturing a decorative sheet, which is attached to an article to decorate the article, and includes: a step (a) of acquiring an image of the article; a step (b) of generating a three-dimensional model of the article based on the image of the article; and a step (c) of arranging a design on at least a part of a surface of the three-dimensional model and generating image data for printing the arranged design on a pressure-sensitive adhesive sheet.

An information processing program according to the present invention for achieving the above object causes a computer to execute: a procedure (a) of acquiring an image of an article to be decorated by attaching a decorative sheet; a procedure (b) of generating a three-dimensional model of the article based on the image of the article; a procedure (c) of arranging a design on at least a part of a surface of the three-dimensional model and generating image data for printing an arranged design on the decorative sheet; and a procedure (d) of transmitting the image data to a printing device that prints an image based on the image data on the pressure-sensitive adhesive sheet.

Advantageous Effect of the Invention

According to the present invention, it is configured to generate the three-dimensional model of the article to which the decorative sheet is to be attached, arrange the design on at least a part of the surface of the three-dimensional model, and generate the image data for printing the arranged design on the pressure-sensitive adhesive sheet. Therefore, for any article, the seal, the cover, or the like that covers the surface of the article can be easily customized using the decorative sheet.

DETAILED DESCRIPTION OF EMBODIMENTS

Figure 1:
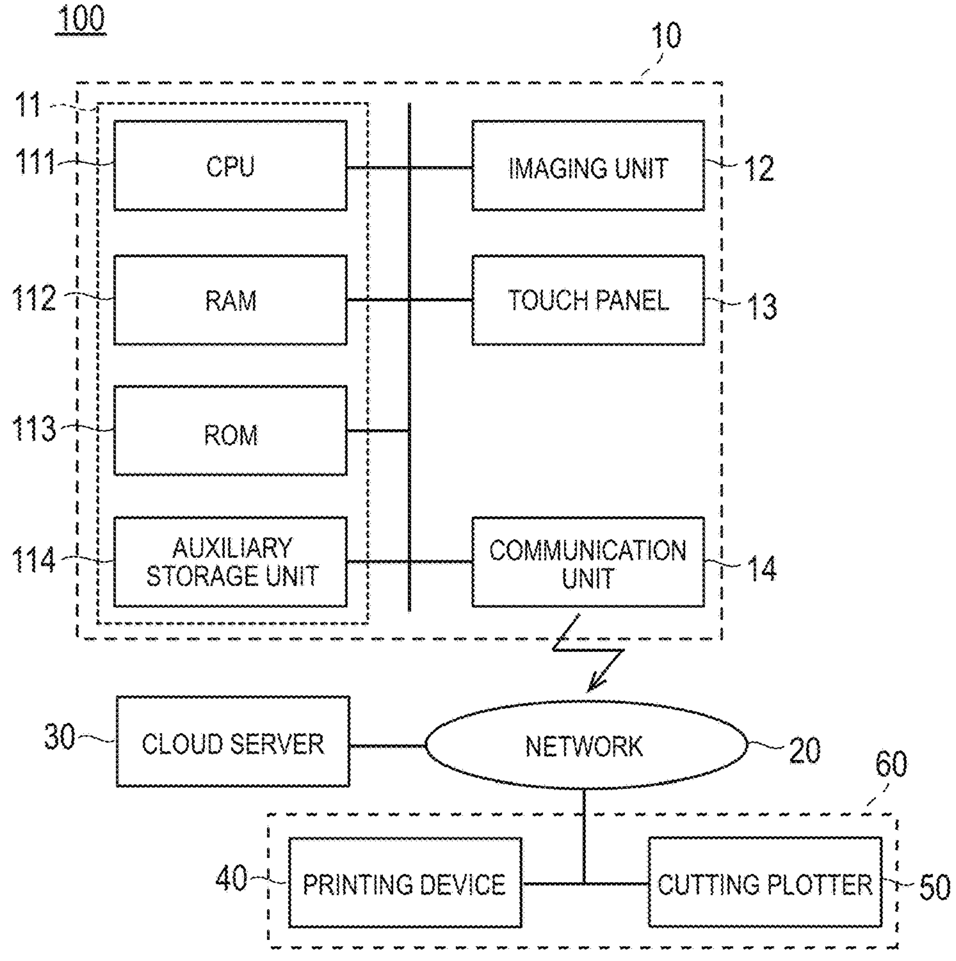
FIG. 1 is a block diagram illustrating a schematic configuration of a decorative sheet manufacturing system according to an embodiment.

Hereinafter, an embodiment of the present invention will be described with reference to the accompanying drawings. Note that the same elements will be denoted by the same reference signs in the description of the drawings, and redundant descriptions thereof will be omitted. In addition, dimensional ratios in the drawings are exaggerated for convenience of the description, and are different from the actual ratios in some cases.

<Configuration of Decorative Sheet Manufacturing System 100>

FIG. 1 is a block diagram illustrating a schematic configuration of a decorative sheet manufacturing system 100 according to an embodiment. The decorative sheet manufacturing system 100 includes an information processing apparatus 10, a network 20, a cloud server 30, a printing device 40, and a cutting plotter 50.

The information processing apparatus 10 is a computer such as a smartphone, a tablet terminal, or a personal computer, and includes a control unit 11, an imaging unit 12, a touch panel 13, and a communication unit 14. Hereinafter, in the present embodiment, a case where the information processing apparatus 10 is a smartphone will be described as an example.

The control unit 11 performs overall control of the imaging unit 12, the touch panel 13, and the communication unit 14 to implement various functions. The control unit 11 includes a CPU (Central Processing Unit) 111, a RAM (Random Access Memory) 112, a ROM (Read Only Memory) 113, and an auxiliary storage unit 114.

The CPU 111 executes programs such as an operating system (OS) and an information processing program developed in the RAM 112 to control the operation of the information processing apparatus 10. The information processing program is saved in advance in the ROM 113 or the auxiliary storage unit 114. In addition, the RAM 112 stores data and the like temporarily generated by the processing of the CPU 111. The ROM 113 stores programs executed by the CPU 111 and data, parameters, and the like used for executing the programs. The auxiliary storage unit 114 includes, for example, a flash memory.

The imaging unit 12 includes at least one camera, and captures images of an article to which a decorative sheet is to be attached from different viewpoints according to an instruction of the control unit 11. The camera may be, for example, a visible light camera or an infrared camera. In addition, the camera may be a stereo camera. Data of the captured images (visible images or infrared images) is transmitted to the control unit 11 and used for generation of a three-dimensional model as will be described below.

In addition, the imaging unit 12 can also include a LiDAR sensor instead of the camera, measure a distance between the LiDAR sensor and the article, and transmit information (a distance image) regarding the measured distance to the control unit 11. In this case, the three-dimensional model is generated based on the distance image. Hereinafter, a case where the imaging unit 12 includes a stereo camera will be described as an example.

The touch panel 13 includes a position input device such as a touch pad and a display device (display unit) such as a liquid crystal display or an organic light emitting display, and can simultaneously process reception of an input by a user and display of information in parallel. For example, the touch panel 13 displays an operation menu on the display device, and receives the user's input (operation) with respect to the operation menu. In addition, in the present embodiment, the display device displays the three-dimensional model, a developed view obtained by developing the three-dimensional model on a plane, and the like as will be described below.

The communication unit 14 communicates with the cloud server 30 through the network 20 including a wireless communication network, the Internet, and the like. The communication unit 14 includes a reception unit that receives data transmitted from the cloud server 30 and a transmission unit that transmits data to the cloud server 30.

The printing device 40 prints an image based on image data on a pressure-sensitive adhesive sheet (medium). The printing device 40 may adopt any of printing methods such as an electrophotographic method, an inkjet method, and a thermal transfer method. The cutting plotter 50 cuts (punches) the pressure-sensitive adhesive sheet on which the image has been printed by the printing device 40 into a predetermined shape. The printing device 40 and the cutting plotter 50 constitute a processing apparatus 60. The processing apparatus 60 can also further include a device that attaches a laminate film to the printed pressure-sensitive adhesive sheet. In addition, the processing apparatus 60 can also further include a device that attaches an application tape to the cut pressure-sensitive adhesive sheet. The application tape is a tape that is attached to a non-pressure-sensitive adhesive side of the pressure-sensitive adhesive sheet to facilitate the attachment work of the pressure-sensitive adhesive sheet, and peeled off after the pressure-sensitive adhesive sheet is attached to the article.

<Functions of Control Unit 11>

Figure 2:
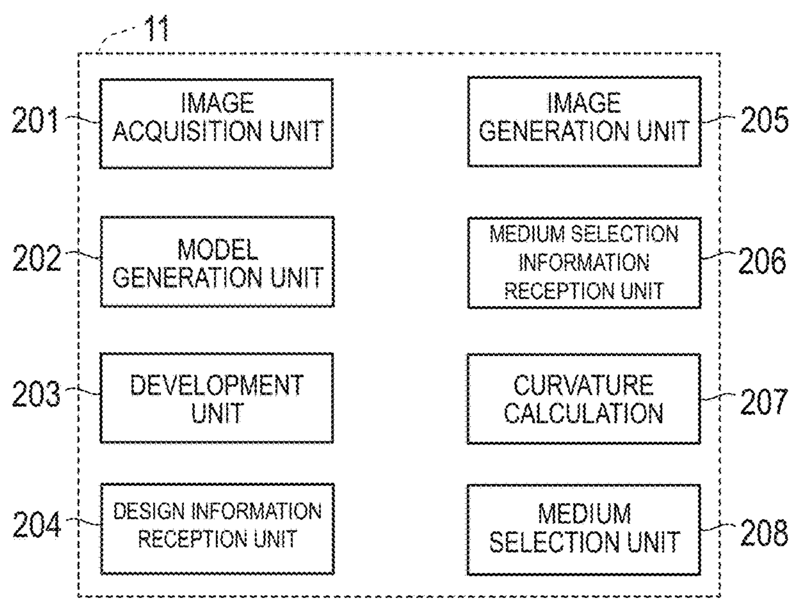
FIG. 2 is a functional block diagram illustrating some functions of a control unit illustrated in FIG. 1.

As illustrated in FIG. 2, the control unit 11 functions as an image acquisition unit 201, a model generation unit 202, a development unit 203, a design information reception unit 204, an image generation unit 205, a medium selection information reception unit 206, a curvature calculation unit 207, and a medium selection unit 208 when the CPU 111 executes the information processing program in the present embodiment.

The image acquisition unit 201 acquires an image (a visible image, an infrared image, or a distance image) of an article to which a decorative sheet is to be attached.

The model generation unit 202 generates a three-dimensional model of the article based on the image of the article. For example, in a case where the image acquired by the image acquisition unit 201 is a visible image or an infrared image, the model generation unit 202 generates the three-dimensional model of the article based on a plurality of images obtained by capturing the article from different viewpoints. A known technique (for example, the shape-from-silhouette method or the like) can be used to generate the three-dimensional model. The shape-from-silhouette method is a method of generating a three-dimensional model of an article by extracting silhouette images of the article from a plurality of images obtained by capturing the article from different viewpoints, projecting the respective silhouette images onto a three-dimensional space, and obtaining intersection portions of view volumes. The three-dimensional model may be, for example, a polygon model in which a curved surface is approximately represented by a set of polygons. The polygon model may be generated using a known technique (for example, the Marching cubes method or the like). Note that the three-dimensional model may include not only a plurality of flat surfaces such as the polygon model but also a curved surface.

The development unit 203 develops the surface of the three-dimensional model of the article in a planar manner. For example, in a case where a polygon model is generated as the three-dimensional model of the article, the development unit 203 generates a developed view of the three-dimensional model based on the polygon model of the article. Note that a case where the three-dimensional model is developed in the developed view will be described hereinafter as an example, but a flat surface partially including a convex shape or a concave shape may be used without being limited to the developed view.

The design information reception unit 204 receives a design to be arranged on the surface of the three-dimensional model and information regarding a position where the design is to be arranged. As will be described below, a user can input a design (pattern or image) and a position of the design on the developed view through the touch panel 13, thereby inputting arrangement of the design on the surface of the three-dimensional model. In addition, the user can also directly input the position on the surface of the three-dimensional model instead of inputting the position on the surface of the developed view where the design is to be arranged.

The image generation unit 205 arranges the design on the surface of the three-dimensional model, and generates image data for printing the arranged design on the pressure-sensitive adhesive sheet. The design may be arranged on a whole or a part of the surface of the three-dimensional model in accordance with designation by the user.

The medium selection information reception unit 206 receives medium selection information used to select a medium. The medium selection information includes at least any of adherend information including information regarding the article, which is an adherend, a use condition for use of the decorative sheet, and a material of the decorative sheet. The adherend information includes at least any of an adherend material and a maximum curvature. Examples of the use condition include a place of use (use temperature), an attachment period, and the like. Note that the use temperature often depends on the place of use, and thus, at least any of the place of use and the use temperature cab be included. As will be described below, the medium selection information reception unit 206 receives the medium selection information by the user's input through the touch panel 13.

The adherend material may be, for example, PP, PE, PS, PET, PVC, PC, ABS, acrylic coating, melamine coating, stainless steel, paper, corrugated cardboard, concrete, tiles, wooden boards, ceramic, glass, Teflon (registered trademark), cloth fabric, wall paper, and the like, but is not limited to these materials.

In addition, the maximum curvature of the adherend is a maximum value of a curvature of the adherend to which the decorative sheet is to be attached. In general, the pressure-sensitive adhesive sheet attached to the adherend is more likely to be peeled off as the curvature of the adherend is larger, and thus, it is preferable to attach a pressure-sensitive adhesive sheet having high adhesiveness to an adherend having a large curvature. The medium selection information reception unit 206 receives the maximum curvature by the user's input through the touch panel 13. In addition, the maximum curvature can also be calculated by the curvature calculation unit 207 based on the three-dimensional model, and the medium selection information reception unit 206 receives the calculated maximum curvature in a case where the maximum curvature is calculated by the curvature calculation unit 207.

The place of use may be, for example, indoors (for example, 20° C. to 30° C.), indoors in the winter season (for example, 0° C. to 20° C.), indoors in the summer season (for example, 30° C. to 45° C.), outdoors in the winter season (for example, −20° C. to 0° C. on the assumption of a ski area), outdoors in the summer season (for example, 30° C. to 40° C. on the assumption of the beach), the inside of a car in the summer season (for example, 30° C. to 60° C.), or the inside of a refrigerator (for example, −10° C. to 15° C.), but is not limited to these places (temperatures).

The attachment period may be any period of about several days to 10 years. Typically, the attachment period may be 3 days, 1 week, 1 month, 3 months, half a year, 1 year, 3 years, 5 years, or 10 years. The attachment period is, for example, a period in which it is expected that the pressure-sensitive adhesive sheet can exhibit a sufficient adhesive force to the adherend, and may be set on the assumption that the pressure-sensitive adhesive sheet whose attachment period has been expired can be easily peeled off from the adherend.

In addition, the medium selection information reception unit 206 receives a material of the pressure-sensitive adhesive sheet to be used for the decorative sheet from a list of materials used for the pressure-sensitive adhesive sheet. The materials used for the pressure-sensitive adhesive sheet include, for example, polyvinyl chloride.

The medium selection unit 208 selects the pressure-sensitive adhesive sheet to be used for the decorative sheet based on the medium selection information. The pressure-sensitive adhesive sheet to be used for the decorative sheet can be selected by the user from a list of pressure-sensitive adhesive sheets registered in advance, or can be automatically selected by the medium selection unit 208. In this case, for example, for each of model numbers of the pressure-sensitive adhesive sheets, information regarding a usable adherend material, a usable temperature range, and a range of an attachable period with respect to an adherend is registered in the auxiliary storage unit 114 in advance. The medium selection unit 208 selects the pressure-sensitive adhesive sheet to be used for the decorative sheet based on the information regarding the usable adherend material, the usable temperature range, and the range of the attachable period with respect to an adherend registered in the auxiliary storage unit 114, and the medium selection information input by the user. More specifically, the medium selection unit 208 determines whether or not items of the adherend material, the use temperature, and the attachment period of the input medium selection information are included in the usable adherend material, the usable temperature range, and the range of the attachable period with respect to the adherend, respectively, registered in the auxiliary storage unit 114. The medium selection unit 208 outputs, as a selection result, a model number of a pressure-sensitive adhesive sheet for which it has been determined that the above items are included in the usable adherend material, the usable temperature range, and the range of the attachable period with respect to the adherend, respectively, registered in the auxiliary storage unit 114.

In addition, as the use condition, a difficulty level of attachment of a pressure-sensitive adhesive sheet may be included. For example, when there is no difference in the determination result between pressure-sensitive adhesive sheets for each of the items of the adherend material, the use temperature, and the attachment period of the medium selection information, the medium selection unit 208 can select a pressure-sensitive adhesive sheet in consideration of the difficulty level of attachment of the pressure-sensitive adhesive sheet. For example, when there is no difference in the determination result between the pressure-sensitive adhesive sheets for each of the above items, the medium selection unit 208 may select the pressure-sensitive adhesive sheets in order from a pressure-sensitive adhesive sheet that is relatively easily pasted.

(Decorative Sheet Manufacturing Method)

In a method for manufacturing a decorative sheet of the present embodiment, the information processing apparatus 10 generates image data to be printed on a decorative sheet to be attached to an article, and the processing apparatus 60 prints the image data on a pressure-sensitive adhesive sheet and cuts the pressure-sensitive adhesive sheet into a predetermined shape suitable for attachment. Hereinafter, the decorative sheet manufacturing method will be described in detail separately for processing on the information processing apparatus 10 side and processing on the processing apparatus 60 side.

<Processing on Information Processing Apparatus 10 Side>

Figure 3:
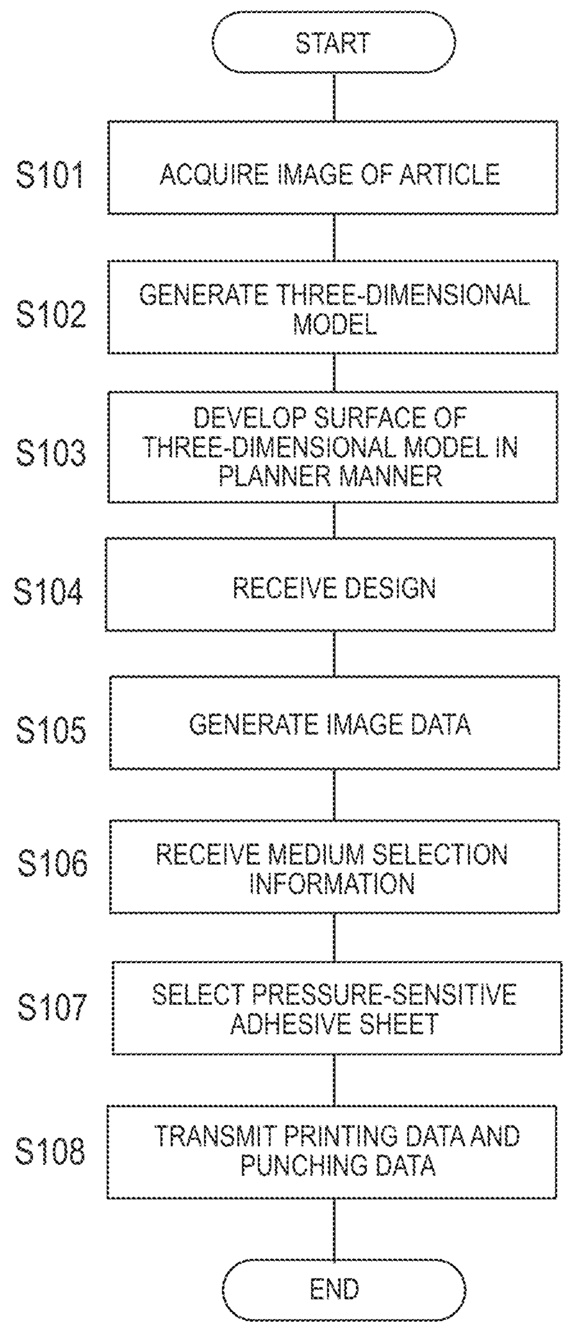
FIG. 3 is a flowchart illustrating a processing procedure on an information processing apparatus side in a decorative sheet manufacturing method.
Figures 4, 5:
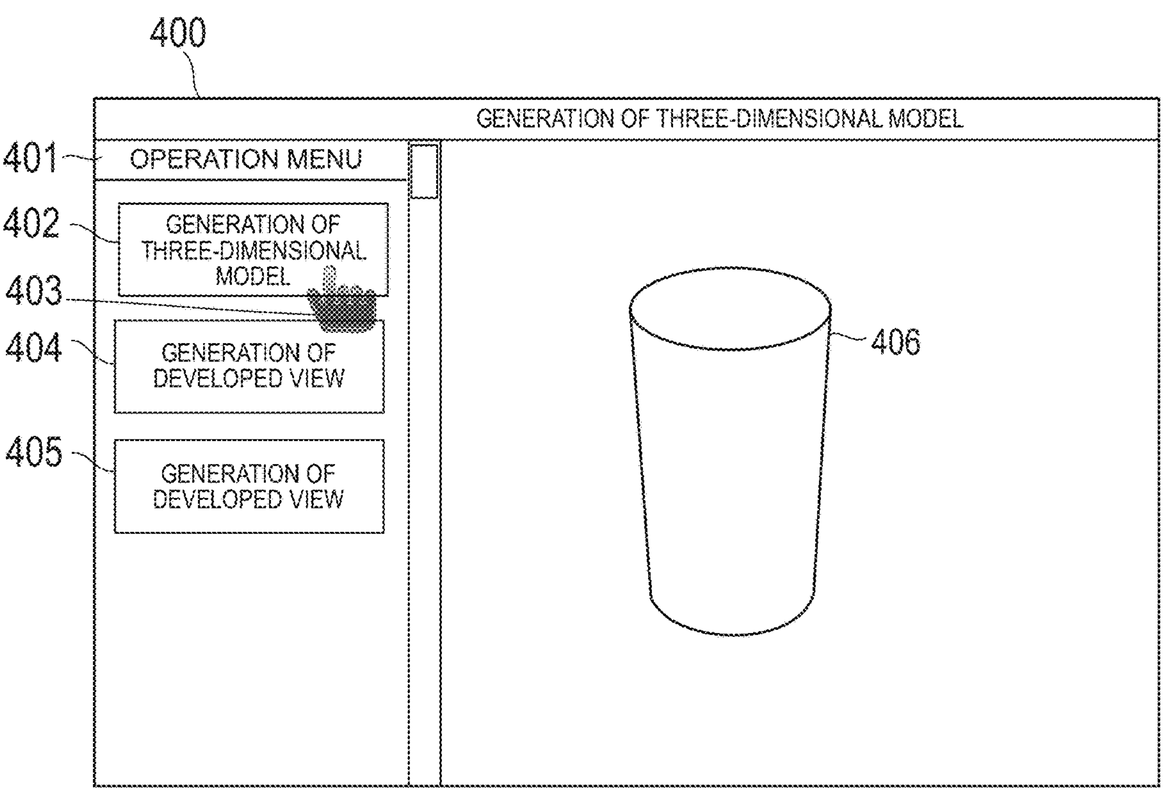
FIG. 4 is a schematic view illustrating an example of an article to which a decorative sheet is to be attached.
FIG. 5 is a schematic view illustrating a three-dimensional model of the article illustrated in FIG. 4.
Figures 6, 7:
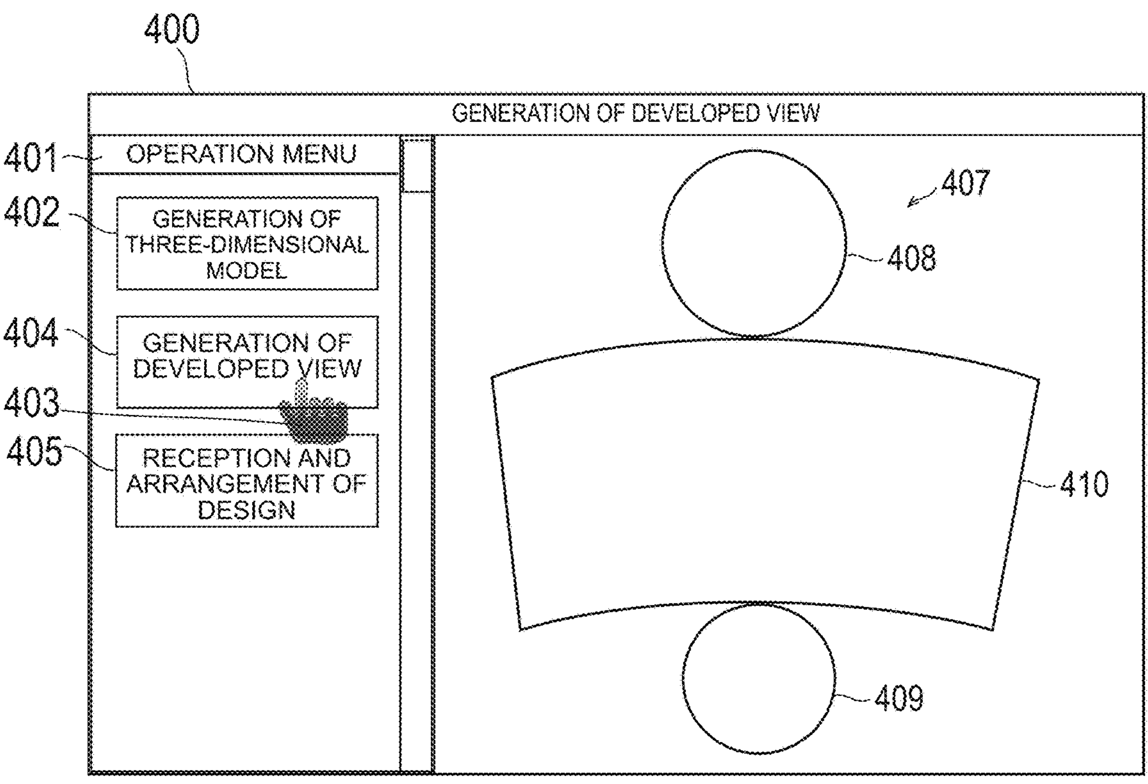
FIG. 6 is a schematic view illustrating a developed view of the three-dimensional model illustrated in FIG. 5.
FIG. 7 is a schematic view illustrating reception and arrangement of a design with respect to the developed view illustrated in FIG. 6.
Figure 8:
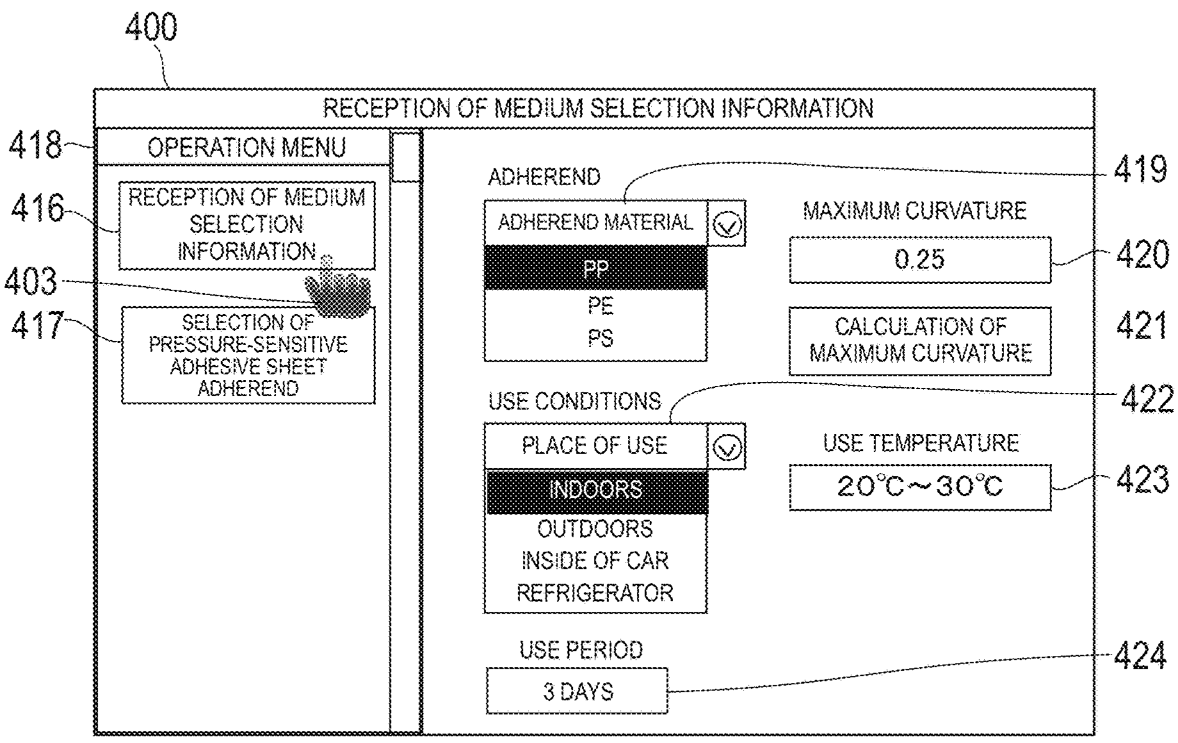
FIG. 8 is a schematic view illustrating a medium selection information reception screen.
Figure 9:
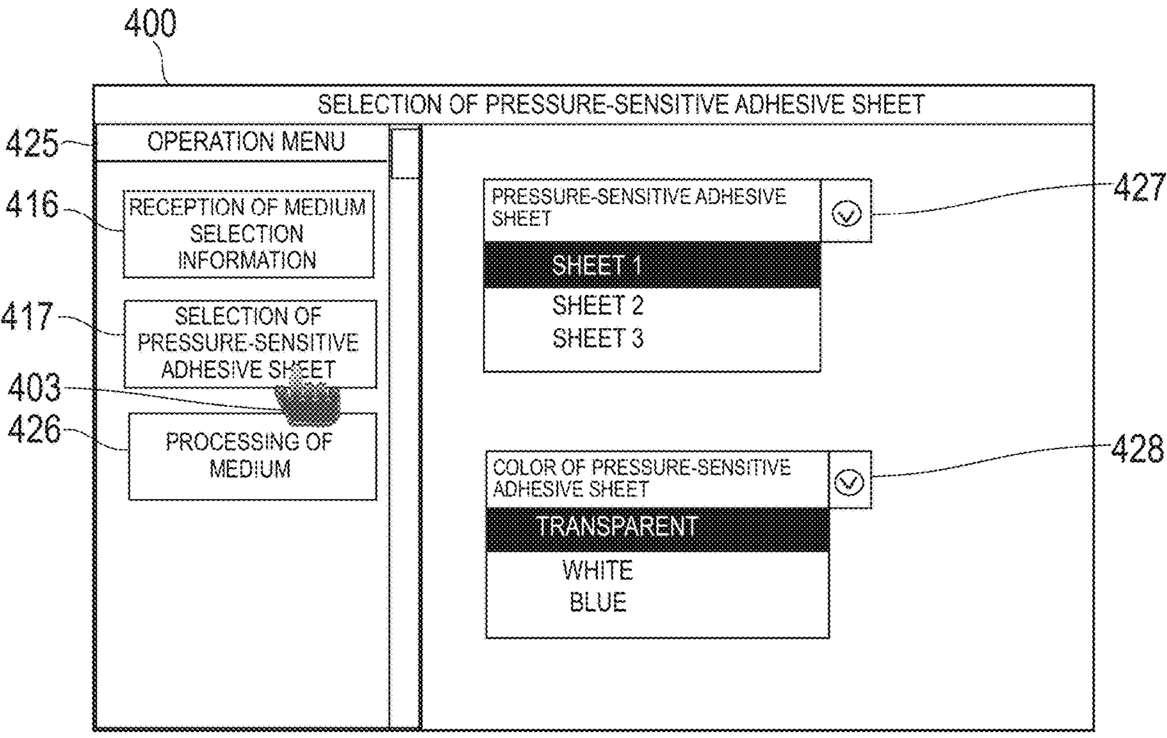
FIG. 9 is a schematic view illustrating a pressure-sensitive adhesive sheet selection screen.

FIG. 3 is a flowchart illustrating a processing procedure on the information processing apparatus 10 side in the decorative sheet manufacturing method. The processing of the flowchart illustrated in FIG. 3 is implemented as the CPU 111 executes the information processing program. In addition, FIG. 4 is a schematic view illustrating an example of an article to which a decorative sheet is to be attached, FIG. 5 is a schematic view illustrating a three-dimensional model of the article illustrated in FIG. 4, and FIG. 6 is a schematic view illustrating a developed view of the three-dimensional model illustrated in FIG. 5. In addition, FIG. 7 is a schematic view illustrating reception and arrangement of a design with respect to the developed view illustrated in FIG. 6, FIG. 8 is a schematic view illustrating a medium selection information reception screen, and FIG. 9 is a schematic view illustrating a pressure-sensitive adhesive sheet selection screen.

As illustrated in FIG. 3, first, an image of the article is acquired (step S101). As illustrated in FIG. 4, a user operates the information processing apparatus 10 to capture images of an article 300 to which a decorative sheet is to be attached. In a case where the imaging unit 12 includes a stereo camera including first and second visible light cameras, the first and second visible light cameras capture visible images captured from different viewpoints and transmit the images to the control unit 11. The control unit 11 causes the captured visible images to be saved in the RAM 112. For example, the user captures the images of the article 300 at different positions A, B, C, and so on.

For example, the positions A, B, and C may be positions respectively facing a front surface, a side surface, and an upper surface of the article 300. Since the images of the article 300 are captured at a plurality of different positions, a plurality of images obtained by capturing the article from different viewpoints can be obtained. In the example illustrated in FIG. 4, the article 300 is, for example, a cylindrical object of which a top surface and a bottom surface are perfect circles having diameters of 9 cm and 8 cm, respectively, and a height is 10 cm. The image acquisition unit 201 acquires images of the front surface, the side surface, and the upper surface of the article 300 captured by each of the first and second visible light cameras.

Next, the three-dimensional model is generated (step S102). As illustrated in FIG. 5, the control unit 11 controls the display device of the touch panel 13 to display an operation menu 401 on a screen 400. The operation menu 401 includes, for example, a "generation of three-dimensional model" button 402, a "generation of developed view" button 404, and a "reception and arrangement of design" button 405. In a case where the user performs an operation of selecting the "generation of three-dimensional model" button 402 with a finger or the like 403, the model generation unit 202 generates a three-dimensional model 406 of the article 300 based on the plurality of images of the article 300 and causes the three-dimensional model 406 to be displayed on the screen 400.

Next, a surface of the three-dimensional model 406 is developed in a planar manner (step S103). As illustrated in FIG. 6, in a case where the user performs an operation of selecting the "generation of developed view" button 404 with the finger or the like 403, the development unit 203 generates a developed view 407 of the three-dimensional model 406 and causes the developed view 407 to be displayed on the screen 400. For example, the developed view 407 includes an upper surface 408, a lower surface 409, and a side surface 410.

Next, a design is received (step S104). In FIG. 6, in a case where the user performs an operation of selecting the "reception and arrangement design" button 405 with the finger or the like 403, the control unit 11 controls the display device of the touch panel 13 to display an operation menu 411 on the screen 400 as illustrated in FIG. 7. The operation menu 411 may include, for example, a "selection of pattern" list 412, a "selection of image" button 413, a "completion of design reception" button 414, and a "generation of image data" button 415.

The user selects a pattern to be arranged on the developed view 407 and a position on the developed view 407 where the pattern is to be arranged. The user can select a desired pattern from a plurality of patterns (for example, a cross, an oblique line, a broken line, a cross, and the like) in the "selection of pattern" list 412. In addition, the user can input a position of the pattern, for example, by selecting any one of the upper surface 408, the lower surface 409, and the side surface 410. FIG. 7 illustrates a case where the user selects the upper surface 408 with the finger or the like 403.

In addition, in a case where the "selection of image" button 413 is operated by the user, the user can select a desired image, illustration, or the like as the design from a list of images registered in advance. When the user inputs the design and the position where the design is to be arranged, and then, operates the "completion of design reception" button 414, the input of the design and the arrangement of the design is finished.

Note that, regarding the design to be selected, it may be configured such that a design such as a pattern, an image, or an illustration stored in advance in the cloud server 30 or the like is used, or it may be configured such that a pattern or an illustration drawn by the user using the touch panel 13 or the like or an image captured by the user in design reception processing is used as the design.

In addition, in a case where the user draws a design, the control unit 11 can be configured to cause a drawing button for starting the other drawing software to be displayed on the operation menu 411 such that the information processing program of the present embodiment cooperates with the other drawing software when the user operates the drawing button. The user creates a pattern or an illustration using the other drawing software, and data of the created pattern or illustration is saved in the RAM 112 or uploaded to the cloud server 30 or the like and is used as the design.

Next, image data is generated (step S105). When the user performs an operation of selecting the "generation of image data" button 415 with the finger or the like 403, the image generation unit 205 arranges the design on the surface of the three-dimensional model and generates image data for printing the arranged design on the decorative sheet. The example of FIG. 7 illustrates a case where a cross pattern is arranged on the upper surface 408. The design information reception unit 204 receives a cross pattern to be arranged on the developed view 407 and information regarding a position on the developed view 407 where the cross pattern is to be arranged. The information regarding the position includes, for example, a region of the upper surface 408 or coordinates (vertex coordinates, center coordinates, barycentric coordinates, and the like). In addition, a hatched pattern is arranged on the side surface 410.

Next, medium selection information is received (step S106). The medium selection information reception unit 206 receives the medium selection information including at least any of a use condition for use of the decorative sheet, adherend information of the article 300, which is an adherend, and a material of the decorative sheet. The use condition of the pressure-sensitive adhesive sheet includes environmental conditions such as a place of use and a use temperature, and an attachment period.

As illustrated in FIG. 8, the control unit 11 causes an operation menu list 418 to be displayed on the screen 400. The operation menu list 418 may include, for example, a "reception of medium selection information" button 416 and a "selection of pressure-sensitive adhesive sheet" button 417. In a case where the user performs an operation of selecting the "reception of medium selection information" button 416 with the finger or the like 403, the medium selection information reception unit 206 causes an "adherend material" list 419, an input field 420 for a maximum curvature, a "calculate maximum curvature" button 421, a "place of use" list 422, an input field 423 for a use temperature, and an input field 424 for a use period to be displayed.

The medium selection information reception unit 206 receives at least any of an adherend material and a maximum curvature of the article 300 as the adherend information. The drawing illustrates a case where the user selects "PP" from the "adherend material" list 419 including "PP", "PE", and "PS" and inputs "0.25" to the input field 420 for a maximum curvature. In addition, after the three-dimensional model of the article 300 is generated in step S102, the curvature calculation unit 207 calculates the maximum curvature of the article 300 based on the three-dimensional model automatically or in a case where the user operates the "calculation of maximum curvature" button 421. The medium selection information reception unit 206 receives the maximum curvature calculated by the curvature calculation unit 207 or the maximum curvature input to the input field 420 by the user.

In addition, the drawing illustrates a case where the user selects "indoors" from the "place of use" list 422 including "indoors", "outdoors", "inside of car", and "refrigerator". In addition, the user inputs numerical values to the input field 423 for a use temperature and the input field 424 for a use period, and the medium selection information reception unit 206 receives the use temperature and the use period. The drawing illustrates a case where the user inputs 20° C. to 30° C. as the use temperature and 3 days as the use period.

Next, a pressure-sensitive adhesive sheet is selected (step S107). As illustrated in FIG. 9, the control unit 11 causes an operation menu 425 to be displayed on the screen 400. The operation menu 425 may include, for example, the "reception of medium selection information" button 416, the "selection of pressure-sensitive adhesive sheet" button 417, and a "processing of medium" button 426. In a case where the user performs an operation of selecting the "selection of pressure-sensitive adhesive sheet" button 417 with the finger or the like 403, the medium selection unit 208 selects the pressure-sensitive adhesive sheet to be used for the decorative sheet based on the medium selection information. Alternatively, the medium selection unit 208 can also cause a "pressure-sensitive adhesive sheet" list 427 to be displayed on the screen 400 and allow the user to select the pressure-sensitive adhesive sheet through the touch panel 13.

In addition, the medium selection unit 208 can cause a "color of pressure-sensitive adhesive sheet" list 428 to be displayed on the screen 400, and allow the user to select, through the touch panel 13, a color of the pressure-sensitive adhesive sheet as a base of the design to be printed. The color of the pressure-sensitive adhesive sheet may be selected from, for example, transparent and colored (white, blue, and the like). Note that it may be configured to cause a preview of the developed view 407 to be displayed on the selected pressure-sensitive adhesive sheet on the screen 400 such that the user can confirm an image of the design to be printed on the selected pressure-sensitive adhesive sheet.

In addition, the control unit 11 can receive an instruction of the user regarding whether or not to attach a laminate film to the printed pressure-sensitive adhesive sheet. In addition, the control unit 11 can recommend the user to attach the laminate film according to the use condition of the medium selection information received in step S108, for example. For example, when the use condition of the medium selection information is "outdoors" or the use period is one month or longer, the control unit 11 recommends the user to attach the laminate film to the pressure-sensitive adhesive sheet.

Next, printing data and punching data are transmitted (step S108). In a case where the user performs an operation of selecting the "processing of medium" button 426 with the finger or the like 403, the control unit 11 prepares a medium to be supplied to the processing apparatus 60, and transmits the printing data and the punching data to the cloud server 30 through the network 20.

The printing data includes image data of the article 300, printing conditions, and information regarding the pressure-sensitive adhesive sheet. The printing conditions include, for example, size setting, enlargement/reduction setting, color/monochrome setting, and the like of the pressure-sensitive adhesive sheet. The user can change the settings of the printing conditions through the touch panel 13. The information regarding the pressure-sensitive adhesive sheet is a selection result such as a model number or a name of the pressure-sensitive adhesive sheet selected by the medium selection unit 208 or the user.

In addition, the punching data is generated based on the three-dimensional model 406 of the article 300 or the developed view 407 of the three-dimensional model 406, and includes information (for example, coordinates) regarding a position where the pressure-sensitive adhesive sheet is cut out.

In this manner, in the processing illustrated in the flowchart of FIG. 3, the image of the article is acquired, the three-dimensional model 406 of the article and the developed view 407 of the three-dimensional model 406 are generated based on the image of the article, and the design is arranged on at least a part (the upper surface and the side surface) of the surface of the developed view 407. Then, image data for printing the arranged design on the decorative sheet is generated.

Note that the case where the design is arranged on the developed view 407 of the three-dimensional model 406 of the article 300 has been mainly described in the above-described example, but the design can also be directly arranged on the three-dimensional model 406 without generating the developed view 407. In this case, after the three-dimensional model 406 is generated in FIG. 5, the "reception and arrangement of design" button 405 is operated instead of the "generation of the developed view" button 404. With this operation, in a case where it is desired to arrange the design only on a specific surface of the article or the like, the design can be directly arranged on the corresponding surface of the three-dimensional model. For example, in the case of a plate-like article such as a floor tile, it is generally considered that a decorative sheet is attached to a portion as a floor surface having a large surface area, and the decorative sheet is omitted for other surfaces having a small surface area. A process of generating a developed view can be omitted by directly arranging a design on a surface corresponding to the floor surface in a three-dimensional model of the floor tile.

<Processing on Processing Apparatus 60 Side>

Figure 10:
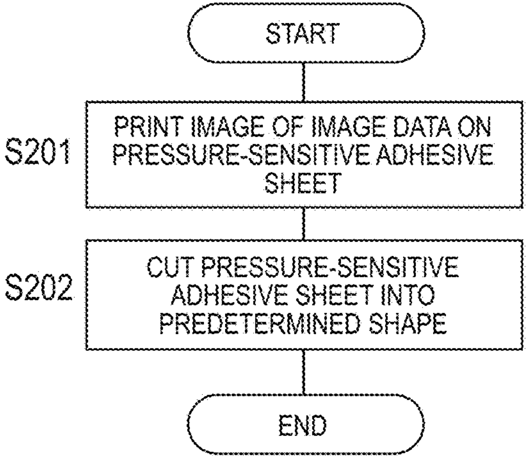
FIG. 10 is a flowchart illustrating a processing procedure on a processing apparatus side in the decorative sheet manufacturing method.
Figure 11:
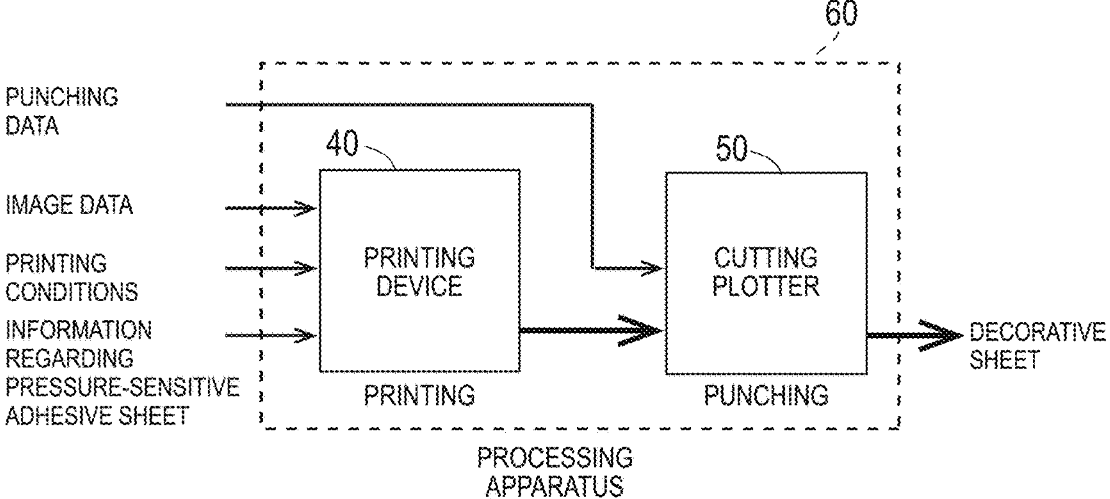
FIG. 11 is a schematic diagram for describing an outline of the processing apparatus.
Figure 12:
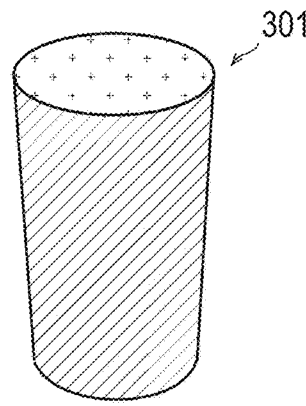
FIG. 12 is a schematic view illustrating a finished product obtained by attaching the decorative sheet to the article illustrated in FIG. 4.

FIG. 10 is a flowchart illustrating a processing procedure on the processing apparatus 60 side of the decorative sheet manufacturing system 100 illustrated in FIG. 1, and FIG. 11 is a schematic view for describing an outline of the processing apparatus 60. The processing of the flowchart illustrated in FIG. 10 is implemented by cooperation of the printing device 40 and the cutting plotter 50. In addition, FIG. 12 is a schematic view illustrating a finished product obtained by attaching a decorative sheet manufactured by the decorative sheet manufacturing system 100 illustrated in FIG. 1 to the article 300 illustrated in FIG. 4.

As illustrated in FIG. 10, an image of image data is printed on a pressure-sensitive adhesive sheet (step S201). As illustrated in FIG. 11, the printing device 40 acquires image data of the article 300, information regarding the pressure-sensitive adhesive sheet, and printing conditions from the cloud server 30. The printing device 40 prints the image of the image data on the pressure-sensitive adhesive sheet corresponding to the information regarding the pressure-sensitive adhesive sheet based on the printing conditions.

In addition, in a case where an instruction of a user to attach a laminate film is received, a process of further attaching the laminate film to the printed pressure-sensitive adhesive sheet can also be included.

Next, the pressure-sensitive adhesive sheet is cut into a predetermined shape (step S202). The cutting plotter 50 acquires punching data from the cloud server 30, and cuts the pressure-sensitive adhesive sheet on which the image has been printed into the predetermined shape based on the punching data. In addition, it is also possible to add a process of attaching an application tape to the cut pressure-sensitive adhesive sheet (decorative sheet). An adhesive force of the application tape with respect to the decorative sheet is smaller than an adhesive force of the decorative sheet with respect to the article 300.

The cut pressure-sensitive adhesive sheet is provided to the user as the decorative sheet. Then, as illustrated in FIG. 12, the user attaches the decorative sheet to a predetermined position (for example, a top surface and a side surface) of the article 300, thereby obtaining the finished product.

(Application Example Applied to Another Article)

Figure 13:
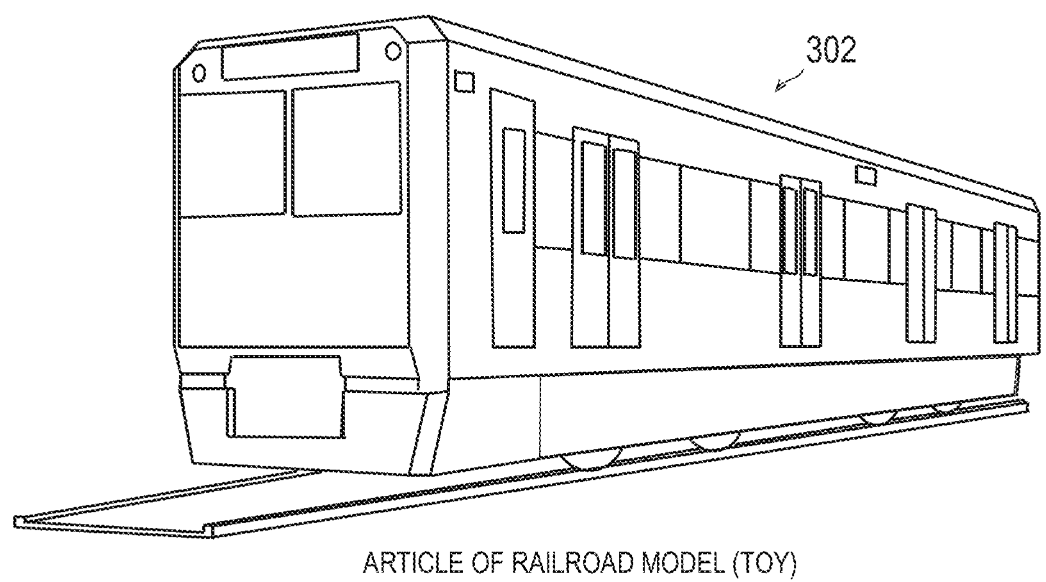
FIG. 13 is a schematic view illustrating another example of an article to which a decorative sheet is to be attached.
Figure 14:
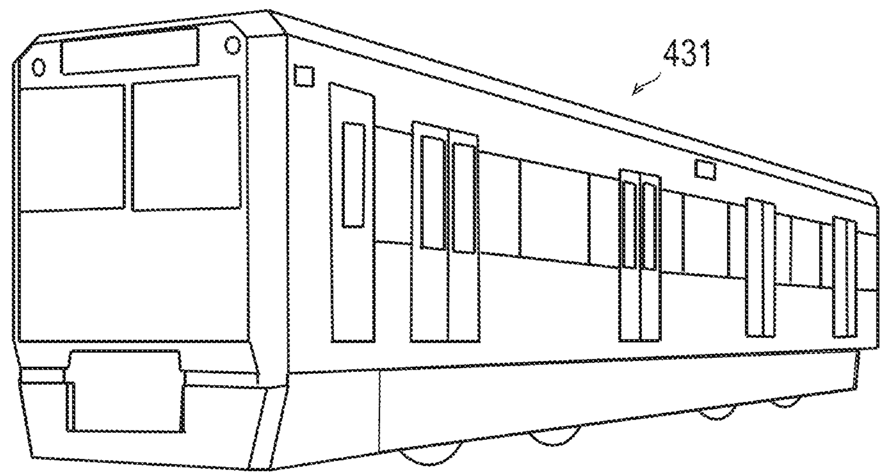
FIG. 14 is a schematic view illustrating a three-dimensional model of the article illustrated in FIG. 13.

FIG. 13 is a schematic view illustrating another example of an article to which a decorative sheet is to be attached, and FIG. 14 is a schematic view illustrating a three-dimensional model of the article illustrated in FIG. 13. In addition, FIG. 15 is a schematic view illustrating a developed view of the three-dimensional model illustrated in FIG. 14, and FIG. 16 is a schematic view illustrating a preview image of a finished product obtained by attaching the decorative sheet to the article illustrated in FIG. 13.

As illustrated in FIG. 13, a case where the decorative sheet is attached to a railroad model (toy), which is an article 302, will be exemplified. A user operates the information processing apparatus 10 so as to capture images of a front surface (back surface), a side surface, and an upper surface of the article 302. The image acquisition unit 201 acquires a plurality of images (images of the front surface, the side surface, and the upper surface) captured by the imaging unit 12, and saves the images in the RAM 112.

Figure 15:
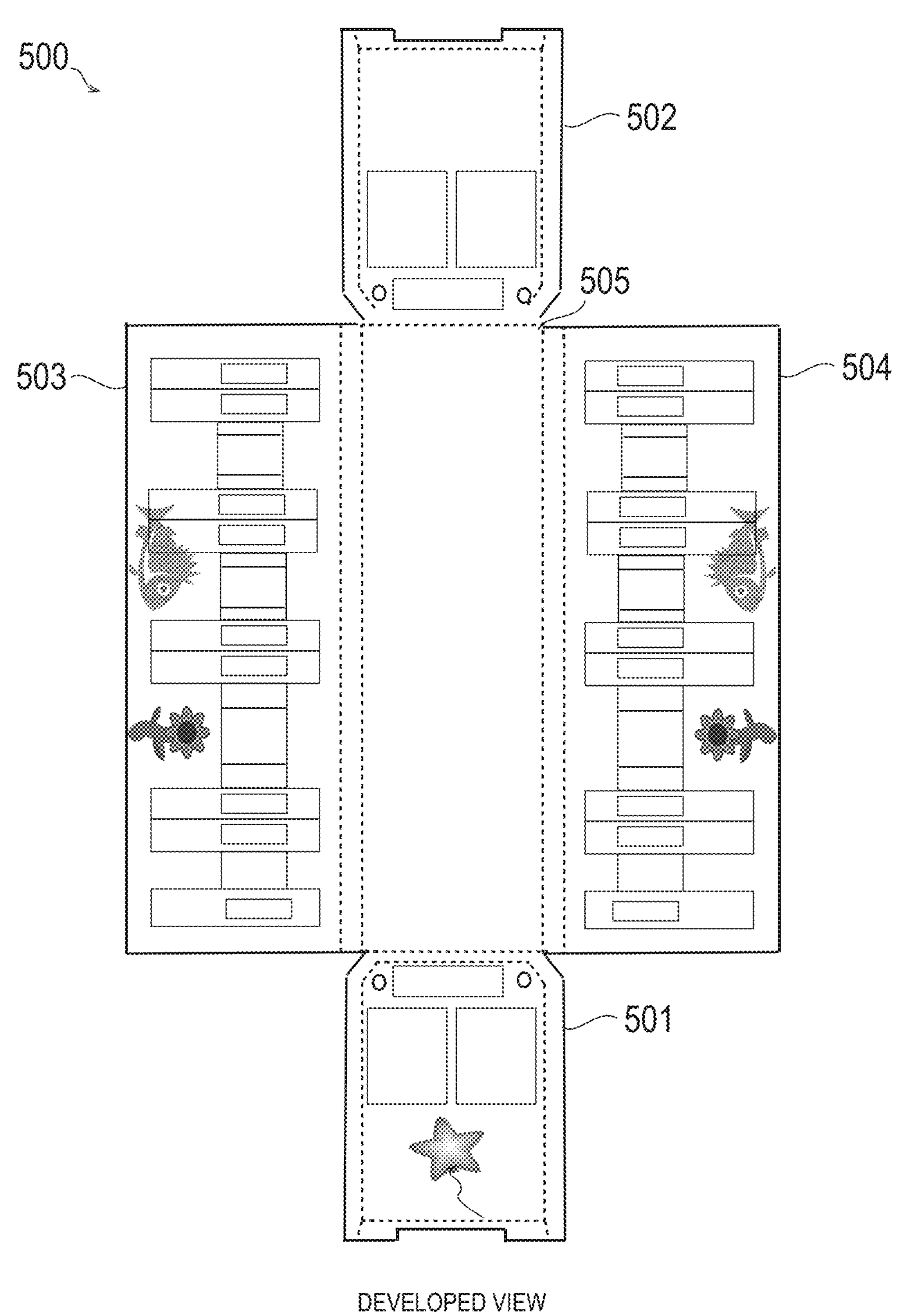
FIG. 15 is a schematic view illustrating a developed view of the three-dimensional model illustrated in FIG. 14.
Figure 16:
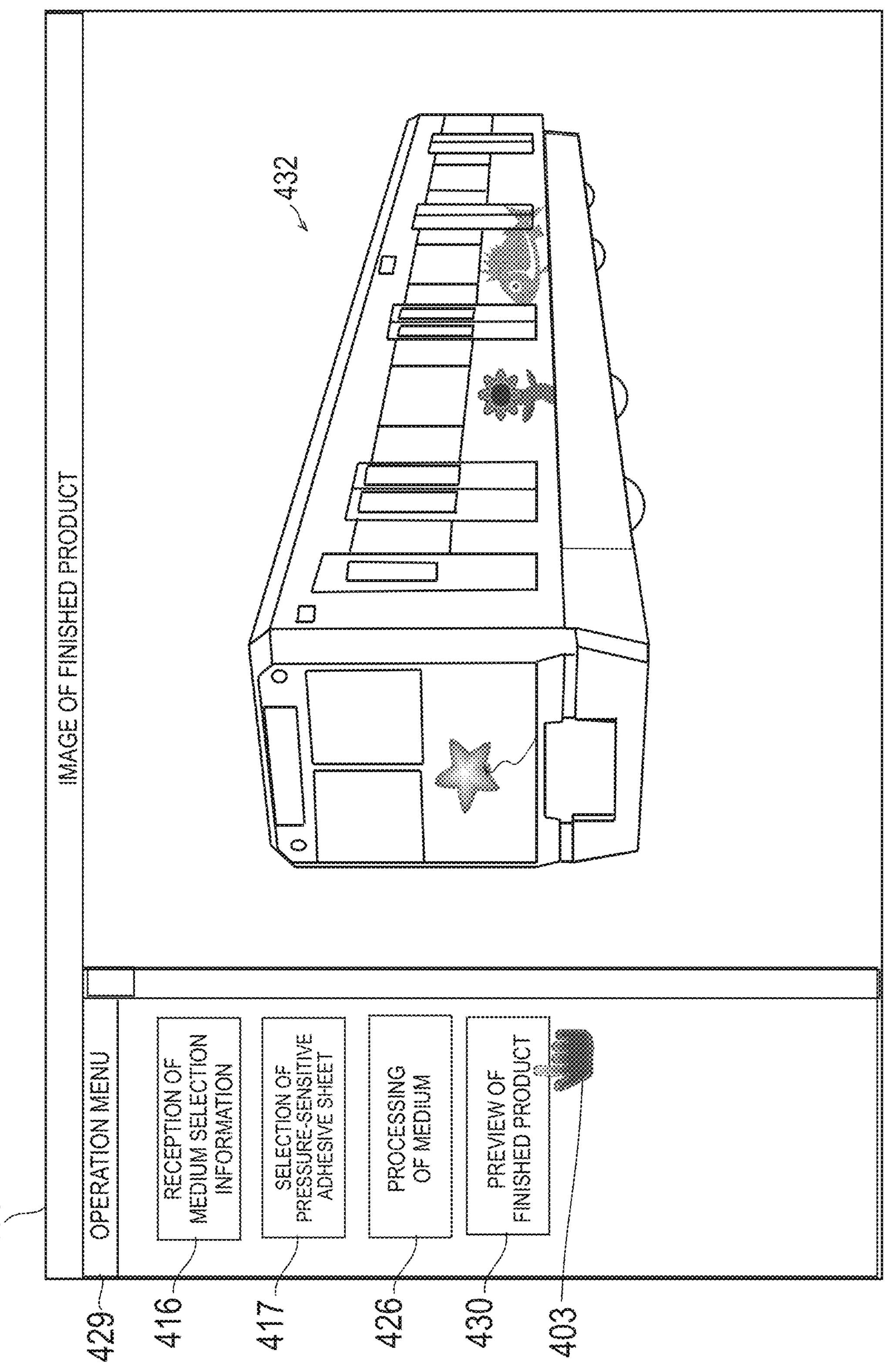
FIG. 16 is a schematic view illustrating a preview image of a finished product obtained by attaching the decorative sheet to the article illustrated in FIG. 13.

As illustrated in FIG. 14, the model generation unit 202 generates a three-dimensional model 431 of the article 302 based on the plurality of images of the article 302 (illustration of an operation menu and the like is omitted in the drawing and the same applies to FIG. 15).

As illustrated in FIG. 15, the development unit 203 generates a developed view 500 of the three-dimensional model 431. The developed view 500 has a front surface portion 501, a back surface portion 502, a right side surface portion 503, a left side surface portion 504, and an upper surface portion 505.

For example, the user designates to arrange a design of "balloon" on the front surface portion 501, and designates to arrange two designs of "flower" and "fish" on each of the right side surface portion 503 and the left side surface portion 504. The design information reception unit 204 receives the designs of "balloon", "flower", and "fish" and position coordinates of these designs. The image generation unit 205 arranges the designs of "balloon", "flower", and "fish" at positions designated by the user, and generates image data for printing the arranged designs on a pressure-sensitive adhesive sheet.

In addition, as illustrated in FIG. 16, the image generation unit 205 can also display a preview image 432 of a finished product, obtained by attaching the decorative sheet to the article 302, on the screen 400. The control unit 11 causes an operation menu 429 to be displayed on the screen 400. The operation menu 429 may include, for example, a "preview of finished product" button 430 in addition to the "reception of medium selection information" button 416, the "selection of pressure-sensitive adhesive sheet" button 417, and the "processing of medium" button 426. In a case where the user performs an operation of selecting the "preview of finished product" button 430 with the finger or the like 403, the image generation unit 205 generates the preview image 432 of the finished product in which the designs of "balloon", "flower", and "fish" have been inserted into the three-dimensional model 431, and causes the generated preview image 432 to be displayed on the screen 400. As the preview image 432 of the finished product is displayed on the screen 400, the user can grasp an image of the finished product before a medium is prepared.

In addition, it may be configured to cause a button for changing a color of the pressure-sensitive adhesive sheet selected in the "color of pressure-sensitive adhesive sheet" list 428 (FIG. 9) to be displayed on the screen 400 such that the user can change the color of the pressure-sensitive adhesive sheet after confirming the preview image 432.

Note that reception of medium selection information, selection of the pressure-sensitive adhesive sheet, and processing of the medium are as described above, and thus, the detailed description thereof will be omitted.

The information processing apparatus, the information processing program, and the decorative sheet manufacturing system and method according to the present embodiment described above have the following effects.

It is configured to generate the three-dimensional model 406 or 431 of the article 300 or 302 to which a decorative sheet is to be attached, arrange a design on at least a part of a surface of the three-dimensional model 406 or 431, and generate image data for printing the arranged design on a pressure-sensitive adhesive sheet. Therefore, an article cover that covers the surface of the article 300 or 302 can be easily customized for any article 300 or 302.

As described above, the information processing apparatus, the information processing program, and the decorative sheet manufacturing system and method have been described in the embodiment. However, it is a matter of course that the present invention can be appropriately added, modified, and omitted by those skilled in the art within the scope of the technical idea.

For example, means and methods for performing various types of processing in the information processing apparatus 10 according to the above-described embodiment can be achieved by either a dedicated hardware circuit or a programmed computer. The above program may be provided by a computer-readable recording medium, for example, a CD-ROM (Compact Disc Read Only Memory) or the like, or may be provided online through a network such as the Internet. In this case, the program recorded in the computer-readable recording medium is generally transferred to and stored in a storage unit such as a hard disk. In addition, the program may be provided as independent application software, or may be incorporated in software of the information processing apparatus 10 as one function of the apparatus.

The present application is based on Japanese Patent Application No. 2021-201596 filed on Dec. 13, 2021, the disclosure of which is incorporated by reference in its entirety.

Note that the following embodiments are also included in the scope of the present invention: any combination of any claim element with any otherclaim element, as well as any modifications and variations thereto.

The invention claimed is:

1. An information processing apparatus, wherein the information processing apparatus is applied to a system that manufactures a decorative sheet, which is attached to an article to decorate the article, and the information processing apparatus comprises a hardware processor, wherein the hardware processor is configured for:

acquiring an image of the article;

generating a three-dimensional model of the article based on the image of the article;

arranging a design on at least a part of a surface of the three-dimensional model and generating image data for printing the arranged design on a pressure-sensitive adhesive sheet, receiving medium selection information including a use condition for use of the decorative sheet, and at least one of adherend information of the article, which is an adherend, and a material of the decorative sheet;

receiving at least any of a use period in which the decorative sheet is used, and an environmental condition under which the decorative sheet is used as the use condition; and selecting the pressure-sensitive adhesive sheet to be used for the decorative sheet based on the medium selection information.

2. The information processing apparatus according to claim 1, wherein the hardware processor is further configured for:

developing the surface of the three-dimensional model in a planar manner, and arranging a design on at least a part of the developed surface.

3. The information processing apparatus according to claim 2, wherein the three-dimensional model is a polygon model, and the hardware processor is further configured for:

generating a developed view of the polygon model of the article, and arranging a design on at least a part of the developed view.

4. The information processing apparatus according to claim 3, further comprising a display device that displays the developed view, wherein the hardware processor is further configured for:

receiving a design to be arranged on the developed view and information regarding a position on the developed view where the design is to be arranged.

5. The information processing apparatus according to claim 1, wherein the hardware processor is further configured for:

receiving the material of the decorative sheet from a list of materials to be used for the pressure-sensitive adhesive sheet.

6. A method for manufacturing a decorative sheet, which is attached to an article to decorate the article, the method comprising:

acquiring an image of the article;

generating a three-dimensional model of the article based on the image of the article;

arranging a design on at least a part of a surface of the three-dimensional model and generating image data for printing an arranged design on a pressure-sensitive adhesive sheet;

receiving medium selection information including a use condition for use of the decorative sheet, and at least one of adherend information of the article, which is an adherend, and a material of the decorative sheet;

receiving at least any of a use period in which the decorative sheet is used, and an environmental condition under which the decorative sheet is used as the use condition; and selecting the pressure-sensitive adhesive sheet to be used for the decorative sheet based on the medium selection information.

7. The method according to claim 6, further comprising:

developing the surface of the three-dimensional model in a planar manner before the generating image data, wherein, in the generating of image data, a design is arranged on at least a part of the surface developed on a plane.

8. The method according to claim 7, wherein the three-dimensional model is a polygon model, a developed view of the polygon model of the article is generated in the developing of the surface of the three-dimensional model, and a design is arranged on at least a part of the developed view in the generating image data.

9. The method according to claim 8, further comprising:

before generating the image data, displaying the developed view; and receiving a design to be arranged on the developed view and information regarding a position on the developed view where the design is to be arranged.

10. The method according to claim 6, further comprising:
printing an image based on the image data on the decorative sheet selected in the selecting a pressure-sensitive adhesive sheet; and
cutting the decorative sheet into a predetermined shape based on information regarding a shape of the surface.

11. The method according to claim 10, further comprising attaching another pressure-sensitive adhesive sheet onto the printed decorative sheet.

12. The method according to claim 11, wherein an adhesive force of the another pressure-sensitive adhesive sheet to the decorative sheet is smaller than an adhesive force of the decorative sheet to the article.

13. A non-transitory computer-readable storage medium storing an information processing program causing a computer to perform:
acquiring an image of an article to be decorated by attaching a decorative sheet;
generating a three-dimensional model of the article based on the image of the article;
arranging a design on at least a part of a surface of the three-dimensional model and generating image data for printing an arranged design on a pressure-sensitive adhesive sheet;
receiving medium selection information including at least any of a use condition for use of the decorative sheet, adherend information of the article, which is an adherend, and a material of the decorative sheet;
receiving at least any of a use period in which the decorative sheet is used, and an environmental condition under which the decorative sheet is used as the use condition;
selecting the pressure-sensitive adhesive sheet to be used for the decorative sheet based on the medium selection information; and
transmitting the image data to a printing device that prints an image based on the image data on the pressure-sensitive adhesive sheet.

14. The storage medium according to claim 13, further causing the computer to perform:
developing the surface of the three-dimensional model in a planar manner before the generating image data,
wherein, in generating of the image data, a design is arranged on at least a part of the surface developed in the planar manner, and image data for printing an arranged design on the decorative sheet is generated.

15. The storage medium according to claim 14, wherein the three-dimensional model is a polygon model,
a developed view of the polygon model of the article is generated in the developing the surface of the three-dimensional model, and
a design is arranged on at least a part of the developed view in the generating image data.

16. The storage medium according to claim 15, further causing the computer to perform:
before generating the image data,
displaying the developed view; and
receiving a design to be arranged on the developed view and information regarding a position on the developed view where the design is to be arranged.

17. The storage medium according to claim 13, further causing the computer to perform:
transmitting a selection result of the pressure-sensitive adhesive sheet to the printing device.

18. An information processing apparatus, wherein the information processing apparatus is applied to a system that manufactures a decorative sheet, which is attached to an article to decorate the article, and the information processing apparatus comprises a hardware processor, wherein the hardware processor is configured for:
acquiring an image of the article;
generating a three-dimensional model of the article based on the image of the article;
arranging a design on at least a part of a surface of the three-dimensional model and generating image data for printing the arranged design on a pressure-sensitive adhesive sheet;
receiving medium selection information including adherend information of the article, which is an adherend, and at least one of a use condition for use of the decorative sheet, and a material of the decorative sheet;
receiving at least any of a material of the article and a maximum curvature of the article as the adherend information; and
selecting the pressure-sensitive adhesive sheet to be used for the decorative sheet based on the medium selection information.

19. The information processing apparatus according to claim 18, wherein the hardware processor is further configured for calculating the maximum curvature, and receiving the calculated maximum curvature.

20. A method for manufacturing a decorative sheet, which is attached to an article to decorate the article, the method comprising:
acquiring an image of the article;
generating a three-dimensional model of the article based on the image of the article;
arranging a design on at least a part of a surface of the three-dimensional model and generating image data for printing an arranged design on a pressure-sensitive adhesive sheet;
receiving medium selection information including adherend information of the article, which is an adherend, and at least one of a use condition for use of the decorative sheet, and a material of the decorative sheet;
receiving at least any of a material of the article and a maximum curvature of the article as the adherend information; and
selecting the pressure-sensitive adhesive sheet to be used for the decorative sheet based on the medium selection information.

21. A non-transitory computer-readable storage medium storing an information processing program causing a computer to perform:
acquiring an image of an article to be decorated by attaching a decorative sheet;
generating a three-dimensional model of the article based on the image of the article;
arranging a design on at least a part of a surface of the three-dimensional model and generating image data for printing an arranged design on a pressure-sensitive adhesive sheet;
receiving medium selection information including adherend information of the article, which is an adherend, and at least one of a use condition for use of the decorative sheet, and a material of the decorative sheet;
receiving at least any of a material of the article and a maximum curvature of the article as the adherend information;
selecting the pressure-sensitive adhesive sheet to be used for the decorative sheet based on the medium selection information; and transmitting the image data to a printing device that prints an image based on the image data on the pressure-sensitive adhesive sheet.

* * * * *